United States Patent
Rehm-Gumbel et al.

(10) Patent No.: US 10,564,052 B2
(45) Date of Patent: Feb. 18, 2020

(54) BLOCK CALIBRATOR FOR CALIBRATING A TEMPERATURE SENSOR

(71) Applicant: SIKA Dr. Siebert & Kühn GmbH & Co. KG, Kaufungen (DE)

(72) Inventors: Michael Rehm-Gumbel, Niedenstein (DE); René Friedrichs, Göttingen (DE)

(73) Assignee: SIKA Dr. Siebert & Kühn Gmbh & Co. KG, Kaufungen (DE)

( * ) Notice: Subject to any disclaimer, the term of this patent is extended or adjusted under 35 U.S.C. 154(b) by 129 days.

(21) Appl. No.: 15/707,061

(22) Filed: Sep. 18, 2017

(65) Prior Publication Data

US 2018/0080836 A1    Mar. 22, 2018

(30) Foreign Application Priority Data

Sep. 19, 2016 (DE) .................. 10 2016 117 572

(51) Int. Cl.
  *G01K 15/00* (2006.01)
  *G01K 7/02* (2006.01)
  *G05D 23/19* (2006.01)

(52) U.S. Cl.
  CPC ............ *G01K 15/002* (2013.01); *G01K 7/02* (2013.01); *G01K 15/00* (2013.01); *G01K 15/005* (2013.01); *G01K 15/007* (2013.01); *G05D 23/1919* (2013.01)

(58) Field of Classification Search
  CPC .... G01K 15/005; G01K 15/007; G01K 13/00; G01K 15/00; G01K 15/002; G01K 2201/00

USPC ...................................................... 374/1, 2, 3
See application file for complete search history.

(56) References Cited

U.S. PATENT DOCUMENTS

| | | | | |
|---|---|---|---|---|
| 3,572,084 A | * | 3/1971 | May ................. | G01N 25/48 374/10 |
| 3,631,708 A | * | 1/1972 | Ensor ............... | G01J 5/522 250/429 |
| 4,627,740 A | * | 12/1986 | Jerde ............... | G01K 15/00 374/1 |
| 4,901,257 A | * | 2/1990 | Chang ............. | G01K 15/005 324/714 |
| 6,709,152 B1 | * | 3/2004 | Bronlund ......... | G01K 15/00 374/1 |
| 6,746,150 B2 | * | 6/2004 | Wienand ......... | G01K 13/02 374/148 |
| 7,708,459 B2 | | 5/2010 | Nakano et al. | |
| 8,651,734 B2 | * | 2/2014 | Sjogren .......... | G01K 15/005 374/1 |

(Continued)

FOREIGN PATENT DOCUMENTS

CN  2304904 Y  1/1999
DE  102008034361 B4  2/2011

(Continued)

*Primary Examiner* — Gail Kaplan Verbitsky
(74) *Attorney, Agent, or Firm* — Dinsmore & Shohl LLP

(57) ABSTRACT

A block calibrator for calibrating a temperature sensor with a heating block, on which or in which at least one heating appliance is disposed, and wherein the heating block features a receiving bore for receiving a calibration insert, into which a test object formed by a temperature sensor can be inserted. According to the invention, an air gap (L) is formed at least in certain areas between an internal wall of the receiving bore and an external wall of the calibration insert.

15 Claims, 4 Drawing Sheets

(56) References Cited

U.S. PATENT DOCUMENTS

| | | | |
|---|---|---|---|
| 8,801,271 B2* | 8/2014 | Harslund | G01K 15/00 374/1 |
| 2007/0291814 A1* | 12/2007 | Hirst | G01K 15/005 374/1 |

FOREIGN PATENT DOCUMENTS

| | | |
|---|---|---|
| EP | 2793008 A1 | 10/2014 |
| JP | 2007127487 A | 5/2007 |
| JP | 2012013496 A | 1/2012 |
| WO | 2010094332 A1 | 8/2010 |
| WO | 2011129689 A1 | 10/2011 |
| WO | WO-2013113683 A2 | 8/2013 |

* cited by examiner

BLOCK CALIBRATOR FOR CALIBRATING A TEMPERATURE SENSOR

FIELD OF THE INVENTION

The invention relates to a block calibrator for calibrating a temperature sensor with a heating block, at which or in which at least one heating appliance is disposed, and wherein the heating block features a receiving bore for receiving a calibration insert, into which at least one test object formed by a temperature sensor can be inserted.

PRIOR ART

The document DE 10 2008 034 361 B4, for example, discloses a block calibrator for calibrating a temperature sensor with a heating block, in which heating appliances are disposed, in order to bring the heating block to a specified temperature. A receiving bore, into which a calibration insert can be inserted, is provided in the heating block, and the calibration insert has a sensor bore into which a temperature sensor can be introduced as a test object.

Another example of a block calibrator is disclosed in the document WO 2013/113683 A2. Several blind holes are provided in a heating block and heating elements, thermometers, as well as heat flux sensors, are placed in the blind holes. Temperature sensors are suitable as test objects that can be inserted into the blind holes. Disadvantageously, the block calibrator does not have a removable calibration insert in the receiving bore, so that only one type of thermometer can be calibrated, which can be inserted into the recesses in an accurately fitting manner.

The problem with using calibration inserts is that, in the case of a clearance fit or a transition fit, they cannot be easily inserted into and removed from the receiving bore at all temperatures. Due to thermal expansion effects as well as surface modifications of the receiving insert, or for example the receiving bore, for instance due to scaling, the calibration insert may get stuck in the receiving bore. An exchange of the calibration insert for allowing the calibration of different temperature sensors as respective test object is thus no longer possible.

If the internal measurements of the receiving bore and the external measurements of the calibration insert are designed according to fitting dimensions such as a clearance fit according to DIN 7157, it can happen that the calibration insert comes to rest on one side on the receiving bore, so that inhomogeneities in the temperature distribution in the heating block are transferred to the temperature distribution in the calibration insert. However, it is preferable that a homogenous temperature dominates in the calibration insert, in particular along the entire circumference of the calibration insert.

DISCLOSURE OF THE INVENTION

The problem underlying the invention is to improve a block calibrator for calibrating a temperature sensor, in which the calibration insert is prevented from getting stuck in the receiving bore and which allows achieving a temperature in the calibration insert that is a homogenous as possible.

The problem is solved based on a block calibrator according to the preamble of claim 1 in conjunction with the characterizing features. Advantageous developments of the invention are presented in the dependent claims.

The invention includes the technical teaching according to which an air gap is formed at least in certain areas between an internal wall of the receiving bore and an external wall of the calibration insert.

An air gap between the external wall of the calibration insert and the internal wall of the receiving bore according to the invention has such gap dimensions that it is bigger than a micro-gap that results from a clearance fit or a transition fit. Due to the air gap, the calibration insert in the receiving bore can no longer get stuck in the receiving bore across a wide range of temperatures, even if surface changes of the external wall of the calibration insert or of the internal wall of the receiving bore arise. In addition, the air gap no longer allows a solid contact between the external wall and the internal wall, so that there can no longer be a unilaterally increased temperature impact onto the receiving insert. Since the calibration insert is produced, in a known manner, from a material with a good thermal conductivity, this results in a temperature integrating effect between the external wall and the internal wall, so that a homogenous temperature can develop in the calibration insert along its circumference. The heat transfer from the heating block to the calibration insert substantially takes place via the air gap, and, while avoiding a solid contact between the calibration insert and the receiving bore in the area of the lateral surface of the calibration insert, allows for a high temperature homogeneity within the calibration insert, even when the heating block with the heating appliances is introduced asymmetrically relative to the longitudinal axis of the calibration insert.

According to an advantageous development of the block calibrator according to the invention, at least one centring means is provided, which provides a centring of the calibration insert in the receiving bore. In this respect, the centring means is formed in such a manner that a uniform air gap is formed between the internal wall of the receiving bore and the external wall of the calibration insert along the entire circumference of the calibration insert, at least at the placement position of the centring means. Thus the rotational axis of the calibration insert coincides with the centre axis of the receiving bore. In particular, when handling the block calibrator, the calibration insert can no longer be moved in the receiving bore, so that the calibration insert also can no longer axially offset.

For example, the centring means completely surrounds the calibration insert at its placement position. As a result, the centring means can either be disposed so that it holds onto the calibration insert, or the centring means is inserted into the receiving bore in such a manner that the centring means remains in the desired placement position when inserting or removing the calibration insert from the receiving bore. The centring means is for example inserted into a groove in the external wall of the calibration insert, or the centring means is inserted into a groove that is provided in the receiving groove. Only one centring means can be provided for centring the calibration insert in the receiving bore. In particular, however, there is also the possibility of providing several centring means that are disposed in a spaced-apart relationship along the longitudinal axis of the calibration insert. For example, the centring means can be disposed at an upper end of the calibration insert, at the front of which at least one sensor bore for receiving the test object or several test object is provided. It is also possible to provide an additional centring means in a bottom area of the calibration insert. In particular, when two preferably spaced-apart centring means are disposed between the calibration insert and the receiving bore, a central alignment of the calibration insert in the entire receiving bore in the heating block can be ensured.

One exemplary embodiment of a centring means can be formed for example with an O-ring or with a metallic spring element. In this respect, the spring element can be inserted for example into a groove in the external wall of the calibration insert or into a groove in the internal wall of the receiving bore. If the centring means is formed as a metallic spring element, for example as a coil spring, and if the coil spring is inserted into a circumferential groove running along the outer circumference in the external wall of the calibration insert, the coil spring can be tensioned. This results in a uniform arrangement of the windings of the coil spring in the peripheral direction of the calibration insert and the desired centred arrangement of the calibration insert in the receiving bore is ensured by the constant winding diameter of the coil spring.

In this respect, the windings of the coil spring can protrude out of the external wall of the calibration insert along a section of the circumference and, while bridging the air gap, be supported by the internal wall of the receiving bore. If the centring means is formed as an O-ring, the cord thickness of the O-ring can be greater than the depth of the groove, so that a centring effect of the calibration insert in the receiving bore is also achieved.

Another advantage is achieved when the air gap has gap dimensions that are greater than a clearance fit of the calibration insert in the receiving bore according to DIN 7157 and/or when the air gap has gap dimensions that are greater than 0.5 mm-2.5 mm. The bigger the air gap, the worse the heat transfer from the heating block to the calibration insert, meaning that the achievement of target temperature in the calibration insert is delayed. Smaller gap dimensions lead to a lesser integration effect for homogenizing the temperature in the calibration insert. Optimal gap dimensions for forming the air gap are thus comprised between 0.5 mm and 2.5 mm, which result from the difference between the radius of the calibration insert and the radius of the receiving bore.

A further homogenization of the temperature in the calibration insert, in particular along the circumferential segments surrounding the longitudinal axis of the calibration insert, is achieved when the external wall of the calibration insert is formed so that it deviates, in sections, from a cylinder lateral surface. In this respect, the deviation can be formed along circumferential segments around the longitudinal axis, or along the longitudinal axis of the calibration insert. For example, it is provided that a section in the outer wall is formed with a reduced diameter along the longitudinal axis of the calibration insert. This section can be placed in such a manner that the greater gap dimensions of the air gap formed by the reduced diameter are provided close to the heating appliances, since these are regions in which the heating block is the hottest. In regions of the heating block that are less hot, the air gap has smaller gap dimensions, so that the heat input into the calibration insert is stronger in those areas. The result is a homogenization of the temperature distribution in the calibration insert that is based on different gap dimensions of the air gap along the lateral surface of the calibration insert.

Another exemplary embodiment for forming the block calibrator provides that the calibration insert has first circumferential segments with a smaller radius and second circumferential segments with a bigger radius. Other circumferential segments with other radiuses are also conceivable. The first circumferential segments with the smaller radiuses cause a greater air gap and are provided in those areas, in which the heating appliances are disposed on the heating block. Diagonally thereto, the second circumferential segments, which lead to a lesser air gap and thus a stronger heat transfer from the heating block to the calibration insert, are provided in the calibration insert. If for example several heating appliances are disposed at the heating block, the circumferential segments with the lesser radiuses can be formed basically across from the areas of the heating block in which the heating appliances are disposed.

The invention also relates to a calibration insert for a block calibrator as described above, the calibration insert having centring means, by means of which the calibration insert can be disposed in a centred manner in the receiving bore of the heating block. In particular, first circumferential segments with a lesser radius and second circumferential segments with a greater radius can be formed in the external wall of the calibration insert.

BRIEF DESCRIPTION OF THE DRAWINGS

In the following, other measures improving the invention are described in more detail in conjunction with the description of a preferred exemplary embodiment of the invention, based on the figures. In the drawings.

DETAILED DESCRIPTION OF THE PREFERRED EMBODIMENTS

Figure 1:
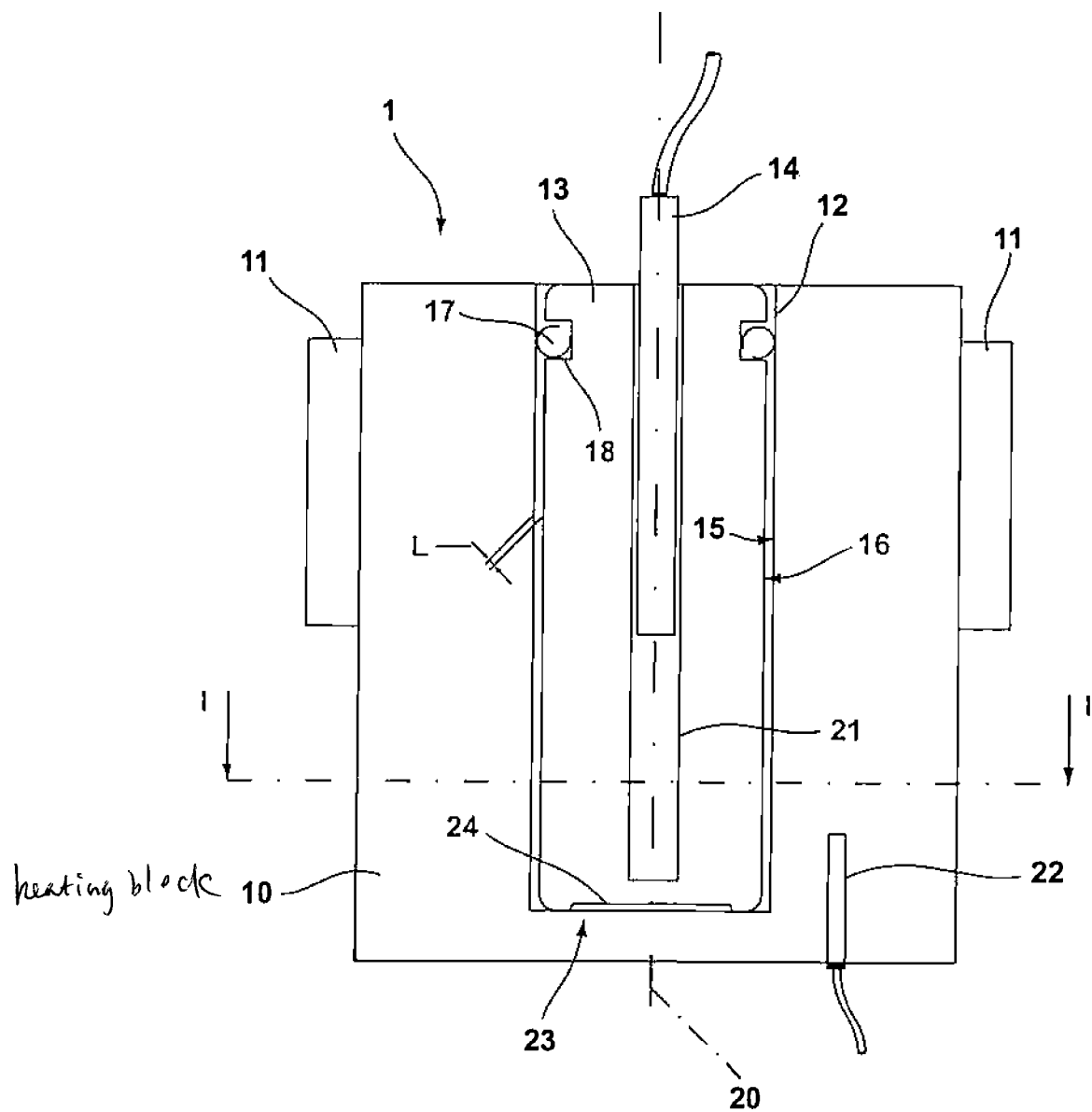
FIG. 1 shows a schematic cross-sectional view of a block calibrator.

FIG. 1 shows a schematic view of a cross-section of the block calibrator 1. The block calibrator has a heating block 10 as a base body, and a receiving bore 12, into which a calibration insert 13 can be introduced, is formed in the heating block 10. The receiving bore 12 is not necessarily produced using a drilling process, so that the receiving bore 12 can be introduced into the heating block 10 in any conceivable manner. The exemplary embodiment shows the calibration insert 13 in a rotationally symmetrical shape, which extends around a longitudinal axis 20, the cross-sectional shape of the receiving bore 12 in the shown exemplary embodiment being adapted to a circular cross-sectional shape of the calibration insert 13. A sensor bore 21, which extends concentrically with the longitudinal axis 20 and into which a test object 14 in form of a temperature sensor can be introduced, is formed within the calibration insert 13. The figure exemplarily only shows one sensor bore 21, but it also possible to form several sensor bores 21 in only one calibration insert 13.

Two heating appliances 11, which can be formed by Peltier elements, are exemplarily attached on the outside of the heating block 10. The heating appliances 11 make it possible to heat the heating block 10, wherein it is also conceivable to cool the heating block 10 with the heating appliances 11, in particular when the heating appliances 11 are formed as Peltier elements.

An additional blind hole, into which a reference sensor 22 is inserted, is provided on the bottom side in the heating block 10. The reference sensor 22 allows for determining a temperature of the heating block 10.

The calibration insert 13 is interchangeably inserted in the heating block 10. To this end, the receiving bore 12 is formed so that it is open toward the upper side of the heating bock 10, so that the receiving bore 12 forms another blind hole in the heating block 10. The test object 14 can also be introduced into and removed from the calibration insert 13 on the upper side. The calibration insert 13 serves amongst others for receiving various test objects 14 that have different diameters. In addition, it is possible to choose a calibration insert 13 adapted to a test object 14 and to insert it into the receiving bore 12.

As a main feature of the block calibrator 1 according to the invention, an air gap L is formed between an internal wall 15 of the receiving bore 12 and an external wall 16 of the calibration insert 13. The exemplary embodiment shows a constant air gap L along the circumferential surface of the calibration insert 13 with a gap dimension of e.g. 0.5 mm-2.5 mm. Due to the provided air gap L, a heat input from the heating block 10 into the calibration insert 13 occurs via the air gap L, resulting in a homogenization of the temperature in the calibration insert 13. By avoiding a solid contact at least between the lateral surface of the calibration insert 13 and the heating block 10, no areas with an increased heat input are formed, and a homogenization of the heat in each circumferential segment around the longitudinal axis 20 can be obtained in the calibration insert 13, due to the thermal conductivity of the material of the calibration insert 13, without being significantly influenced by the heating block 10. In order to minimize the solid contact of the insert bottom 23 with the bottom side of the receiving bore 12 in the heating block 10, the calibration insert 13 has a recess 24 at its bottom surface. As a result, there remains only an external ring contact of the insert bottom 23 with the bottom of the receiving bore 12 in the heating block 10.

In order to achieve a centring of the calibration insert 13 in the receiving bore 12, the arrangement of the calibration insert 13 in the heating block features a centring means 17. The centring means 17 is exemplarily designed as a spring element 19 in the form of a coil spring, which is inserted into a circumferential groove 18, wherein the groove 18 is introduced into the upper area of the lateral surface of the calibration insert 13. Although not shown here, it is also possible to introduce another centring means 17 into the lateral surface of the calibration insert 13, for example close to the insert bottom 23. It is more specifically advantageous to dispose another centring means 17 in the internal wall 15 of the receiving bore 12 in the bottom area of the blind bore.

The centring means 17 causes a concentric arrangement of the calibration insert 13 in the receiving bore 12, so that the central axis of the receiving bore 12 and the longitudinal axis 20 of the calibration insert 13 coincide.

Figure 2:
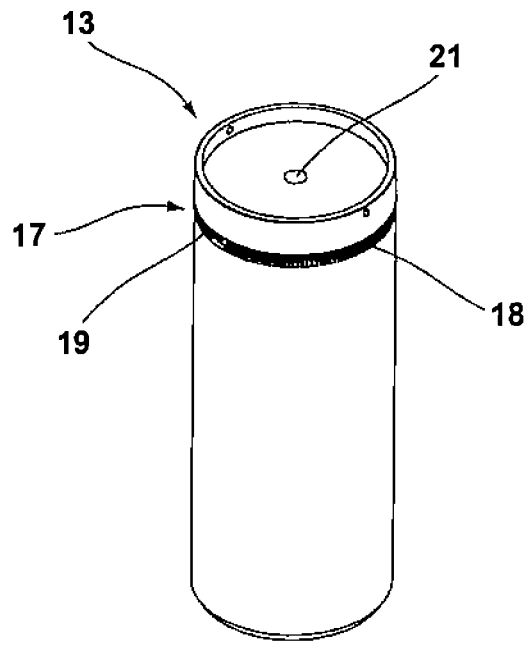
FIG. 2 shows an exemplary embodiment of a calibration insert with a centring means according to the invention.

FIG. 2 shows an example of the calibration insert 13 with a centring means 17 in the form of a spring element 18, which is introduced into the circumferential groove 18 in the lateral surface of the calibration insert 13. The centring means 17 is located at the upper end of the calibration insert 13 adjacent to the front surface, in which only one sensor bore 21, for example, is formed for inserting the test object 14.

Figure 3:
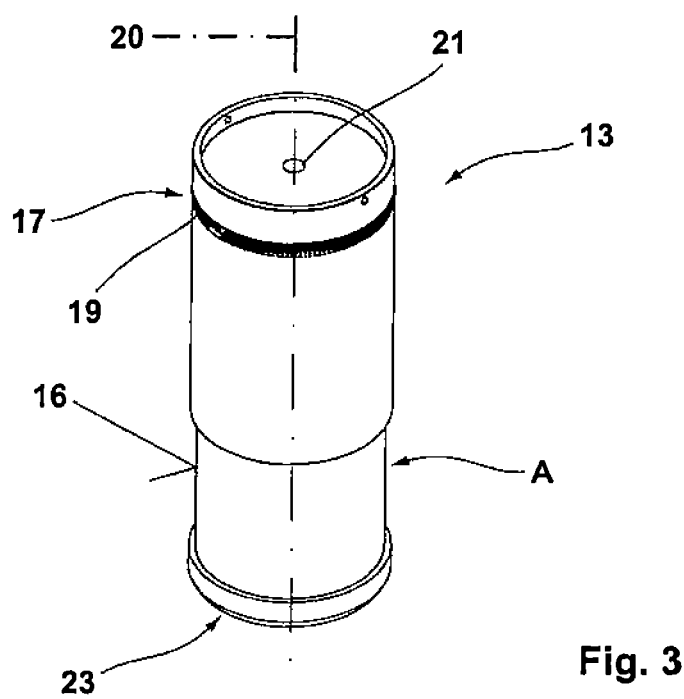
FIG. 3 shows the calibration insert with a section in the external wall having a reduced diameter.

FIG. 3 shows an exemplary embodiment of the calibration insert 13 with the centring means 17 in the form of a spring element 19 in the upper area of the calibration insert 13 adjacent to the front surface in which the sensor bore 21 is formed.

A section A with a reduced diameter, which points toward the insert bottom 23, extends in the external wall 16 along the longitudinal axis 20 in the external circumferential surface of the calibration insert 13. Due to the accompanying enlargement of the air gap L shown in FIG. 1, the heat input into section A from the heating block 10 into the calibration insert 13 is further weakened. This way, a desired temperature profile can be imparted in the calibration insert 13 along the longitudinal axis 20, in particular for homogenizing the temperature along the length of the longitudinal axis 20.

Figure 4:
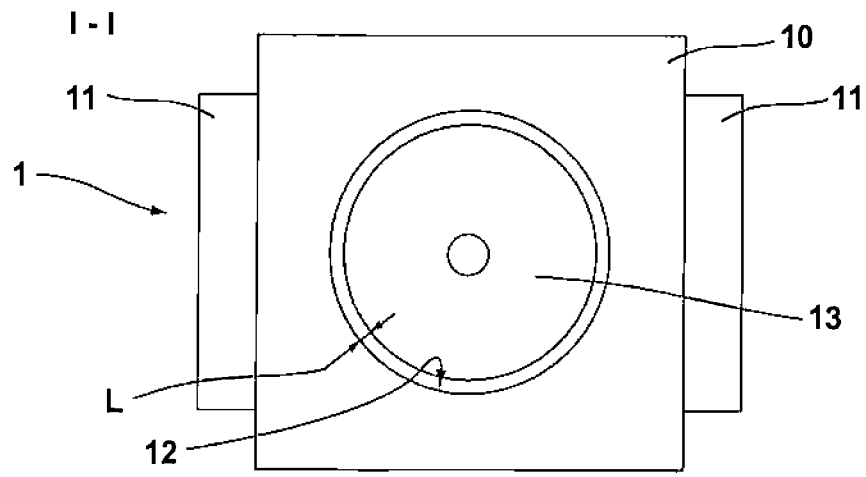
FIG. 4 shows a schematic top view of the block calibrator with a uniformly circumferential smaller air gap.
Figure 5:
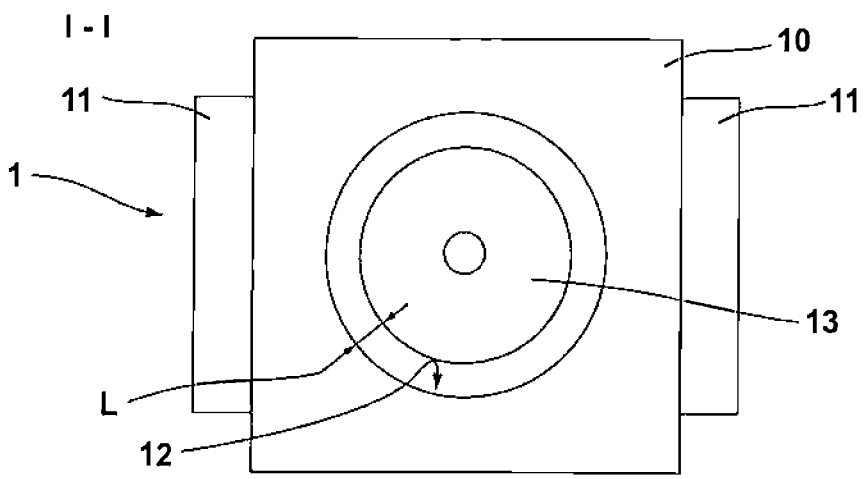
FIG. 5 shows the top view of the block calibrator according to FIG. 4 with a greater air gap, FIG. 6. shows the top view of the block calibrator with a calibration insert, which comprises circumferential segments with different diameters
Figure 6:
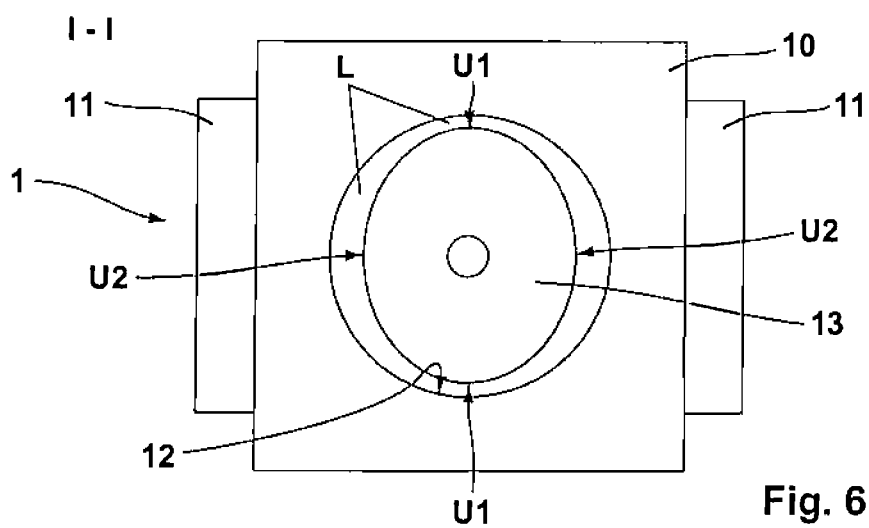

FIGS. 4, 5 and 6 respectively show, in accordance with the sectional view I-I in FIG. 1, a top view onto the block calibration 1 with the heating block 10, with the heating elements 11 in a lateral arrangement on the heating block 10 and with the receiving bore 12, which is centrically provided in the heating block 10. The heating block 10 has a rectangular cross-section.

The calibration insert 13 is introduced into the receiving bore 12 and the air gap L is circumferentially located between the calibration insert 13 and the receiving bore 12. FIG. 4 shows a small air gap L, for example with a gap size of 0.5 mm. FIG. 5 shows the air gap L with a gap size of e.g. 2.5 mm.

FIG. 6 shows a calibration insert 13 with a shape that differs from a cylindrical shape. The calibration insert 13 therefore has first circumferential segments U1 with a greater diameter, and the calibration insert 13 has second circumferential segments U2 with a smaller diameter.

The first circumferential segments U1 result in a smaller gap size of e.g. only 0.5 mm, and the second circumferential segments U2, with the smaller diameter of the calibration insert 13, result in a greater gap size of the air gap L of e.g. 2.5 mm.

This configuration of the calibration insert causes a lower heat transfer into the lateral areas of the second circumferential segments U2, which correspond to those areas in which the heating means 11 are disposed outside on the heating block 10. The resulting inhomogeneous temperature profile in the heating block 10 and bigger and smaller air gaps L lead to a fully balanced temperature profile in the calibration insert 13.

Figure 7:
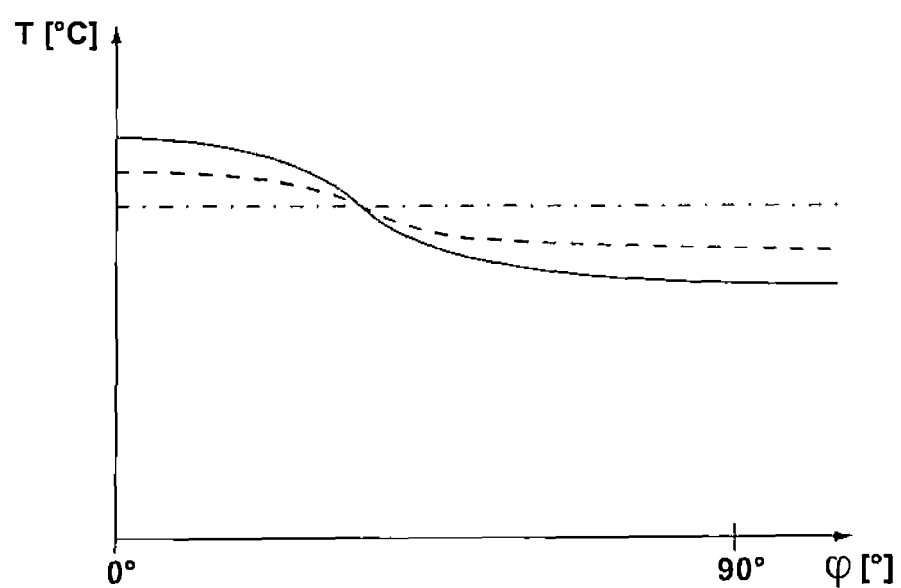
FIG. 7 shows a diagram of the temperature along a circumferential segment of 90° of the cylindrical calibration insert with different temperature profiles.

FIG. 7 shows a diagram of a progression of the temperature T along an angle φ of 0°-90° representing a segment of the calibration insert 13 which corresponds to a quarter of the cross-section surface, the heating elements 11 being disposed at the angle of 0° and the angle of 90° depicting the edge of the segment that is perpendicular to the arrangement of the heating elements 11.

With respect to FIG. 6, the air gap is very big at an angle φ of 0°, and the air gap is small at an angle φ of 90°. The angle φ of 0° thus corresponds to the second circumferential segment U2, and the angle of 90° corresponds to the first circumferential segment U2 in FIG. 6.

The continuous graph represents the temperature changing along the angle of 0°-90°, which, according to FIG. 4, occurs when a small air gap L is formed between the receiving bore 12 and the calibration insert 13 along the entire circumference. The dashed graph shows the temperature profile along the 90° segment according to FIG. 5, in which the air gap L already has a bigger size. The dot-dashed line represents the temperature profile in the calibration insert 13 along a 90° segment with the circumferential segments U1 and U2 in the calibration insert 13. The temperature progressions show that by enlarging the air gap, a homogenization of the temperature in the calibration insert 13 can be produced, and if the circumferential segments U1 and U2 with corresponding radiuses in the calibration insert 13 are adapted in such a manner that a weaker heat transition into hotter areas of the heating block 10 is caused, the temperature profile in the calibration insert 13 can be substantially completely homogenized.

The implementation of the invention is not limited to the previously mentioned exemplary embodiment. Rather, a number of variants are conceivable, which make use of the described solution in fundamentally different embodiments. All the features and/or advantages resulting from the claims, the description and the drawings, including design details or spatial arrangements, can be essential to the invention both on their own and in various combinations.

LIST OF REFERENCE NUMERALS

1 Block calibrator
10 Heating block
11 Heating appliance
12 Receiving bore
13 Calibration insert
14 Test object
15 Internal wall
16 External wall
17 Centring means
18 Circumferential groove
19 Spring element
20 Longitudinal axis
21 Sensor bore
22 Reference sensor
23 Insert bottom
24 Recess
L Air gap
A Section with a reduced diameter
U1 First circumferential segment
U2 Second circumferential segment

The invention claimed is:

1. A block calibrator for calibrating a temperature sensor, comprising:
   a heating block including a receiving bore, the receiving bore having an internal wall;
   at least one heating appliance disposed on or in the heating block;
   a calibration insert received by the receiving bore of the heating block, the calibration insert having an external wall, the calibration insert adapted for insertion of at least one test object therein, the test object including a temperature sensor; and
   at least one centering element for the centering of the calibration insert in the receiving bore to form an air gap with a lateral clearance between the internal wall of the receiving bore and the external wall of the calibration insert across the entire circumference and surface of the calibration insert.

2. The block calibrator according to claim 1, wherein the centering element completely surrounds the calibration insert at a placement position.

3. The block calibrator according to claim 1, wherein the centering element engages the receiving bore and/or onto the calibration insert.

4. The block calibrator according to claim 1, wherein the calibration insert includes a circumferential groove in the external wall, the centering element being disposed in the circumferential groove.

5. The block calibrator according to claim 4, wherein the centering element comprises an O-ring.

6. The block calibrator according to claim 1, wherein the air gap has gap dimensions that are greater than a clearance fit with a circumference clearance of the calibration insert in the receiving bore according to DIN 7157 and/or the air gap has gap dimensions that are greater than 0.5 mm-2.5 mm.

7. The block calibrator according to claim 1, wherein the external wall of the calibration insert has a cylindrical shape and comprises sections of a different diameter.

8. The block calibrator according to claim 7, wherein one of the section is formed with a reduced diameter.

9. The block calibrator according to claim 7, wherein the sections include first circumferential sections with a smaller diameter and second circumferential sections with a greater diameter.

10. A calibration insert for a block calibrator according to claim 1, the calibration insert comprising:
    a centering element, by means of which the calibration insert is disposed in a centered manner in the receiving bore of the heating block.

11. The calibration insert according to claim 10, wherein the external wall of the calibration insert has a cylindrical shape and comprises sections of a different radius, the sections include first circumferential sections with a smaller radius and second circumferential sections with a greater radius.

12. The block calibrator according to claim 1, wherein the calibration insert is exchangeable.

13. A block calibrator for calibrating a temperature sensor, comprising:
    a heating block including a receiving bore, the receiving bore having an internal wall;
    at least one heating appliance disposed on or in the heating block;
    a calibration insert received by the receiving bore of the heating block, the calibration insert having an external wall, the calibration insert adapted for insertion of at least one test object therein, the test object including a temperature sensor; and
    at least one centering element for centering of the calibration insert in the receiving bore;
    wherein an air gap is formed at least in certain areas between the internal wall of the receiving bore and the external wall of the calibration insert,
    wherein the calibration insert includes a circumferential groove in the external wall, the centering element being disposed in the circumferential groove,
    wherein the centering element comprises a metallic spring element.

14. The block calibrator according to claim 13, wherein the spring element is inserted in the groove.

15. The block calibrator according to claim 13, wherein the spring element is a coil spring, wherein the windings of the coil spring are configured to protrude with a section of a circumference extending out of the external wall of the calibration insert, bridging the air gap, and being supported by the internal wall of the receiving bore.

* * * * *